(12) United States Patent
Smith et al.

(10) Patent No.: US 10,091,000 B2
(45) Date of Patent: Oct. 2, 2018

(54) TECHNIQUES FOR DISTRIBUTING SECRET SHARES

(71) Applicant: INTEL CORPORATION, Santa Clara, CA (US)

(72) Inventors: Ned Smith, Hillsboro, OR (US); William Deleeuw, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 131 days.

(21) Appl. No.: 14/495,362

(22) Filed: Sep. 24, 2014

(65) Prior Publication Data

US 2016/0087792 A1    Mar. 24, 2016

(51) Int. Cl.
*H04L 9/08* (2006.01)

(52) U.S. Cl.
CPC ............ *H04L 9/085* (2013.01); *H04L 9/0866* (2013.01); *H04L 9/0872* (2013.01)

(58) Field of Classification Search
CPC ..... H04L 9/085; H04L 9/0869; H04L 9/0872; H04L 9/0866
See application file for complete search history.

(56) References Cited

U.S. PATENT DOCUMENTS

| | | | | |
|---|---|---|---|---|
| 4,944,009 | A * | 7/1990 | Micali | H04L 9/0662 380/30 |
| 9,008,303 | B1 * | 4/2015 | Juels | 380/44 |
| 2007/0160197 | A1 * | 7/2007 | Kagaya | G06Q 20/382 380/28 |
| 2007/0189539 | A1 | 8/2007 | Kim et al. | |
| 2008/0181398 | A1 | 7/2008 | Pappu | |
| 2009/0077379 | A1 | 3/2009 | Geyzel et al. | |
| 2009/0136024 | A1 * | 5/2009 | Schneider | H04L 9/085 380/28 |
| 2009/0319769 | A1 * | 12/2009 | Betouin | H04L 9/0861 713/150 |
| 2011/0209200 | A2 * | 8/2011 | White | G06F 21/32 726/4 |
| 2013/0038447 | A1 * | 2/2013 | Peng | G07C 9/00309 340/540 |
| 2013/0114815 | A1 | 5/2013 | Nishimaki et al. | |

(Continued)

FOREIGN PATENT DOCUMENTS

WO    WO 2015099661 A1 *    7/2015    ......... G06F 21/6254

OTHER PUBLICATIONS

"Shamir's Secret Sharing", <http://en.wikipedia.org/wiki/Shamir%27s_Secret_Sharing>, 7 pages (date unknown, Author unknown).

(Continued)

*Primary Examiner* — Meng Li

(57) ABSTRACT

Various embodiments are generally directed to an apparatus, method and other techniques generating one or more polynomial elements for a polynomial function using a node value of a pseudo random number generator tree as a seed value, the polynomial function comprising a secret value and the polynomial elements, and the pseudo random number generator tree at least partially matching at least one other pseudo random number generator tree on another device, generating a plurality of share values based on the one or more polynomial elements and the polynomial function and distributing a share value of the plurality of share values to a device.

22 Claims, 12 Drawing Sheets

(56) References Cited

U.S. PATENT DOCUMENTS

2014/0089683 A1   3/2014  Miller et al.
2014/0205087 A1*  7/2014  Sakumoto ............. H04L 9/3271
                                                   380/30

OTHER PUBLICATIONS

International Search Report and Written Opinion received for PCT Patent Application No. PCT/US2015/046535, dated Mar. 10, 2016, 9 pages.
Supplementary European Search Report for European Application No. 15844210, dated Apr. 19, 2018, 2 pages.
Budakoglu C. et al: "Hierarchical key management for mobile ad-hoc networks", 2004 IEEE 60th Vehicular Technology Conference. vol. 4, Sep. 26, 2004, pp. 2735-2738.

* cited by examiner

800

GENERATE ONE OR MORE POLYNOMIAL ELEMENTS FOR A POLYNOMIAL FUNCTION USING A NODE VALUE OF A PSEUDO RANDOM NUMBER GENERATOR TREE AS A SEED VALUE, THE POLYNOMIAL FUNCTION COMPRISING A SECRET VALUE AND THE POLYNOMIAL ELEMENTS, AND THE PSEUDO RANDOM NUMBER GENERATOR TREE AT LEAST PARTIALLY MATCHING ONE OTHER PSEUDO RANDOM NUMBER GENERATOR TREE ON ANOTHER DEVICE
805

GENERATE A PLURALITY OF SHARE VALUES BASED ON THE ONE OR MORE POLYNOMIAL ELEMENTS AND THE POLYNOMIAL FUNCTION
810

DISTRIBUTE A SHARE VALUE OF THE PLURALITY OF SHARE VALUES TO A DEVICE
815

*FIG. 8*

TECHNIQUES FOR DISTRIBUTING SECRET SHARES

TECHNICAL FIELD

Embodiments described herein generally relate to techniques to distribute secret shares.

BACKGROUND

Secret information such as user credentials, biometric data, personal data, security settings data, and so forth increasingly need to be stored securely to prevent unintended disclosure due to loss or theft of the device storing the information, e.g. thumb drive, smartphone, tablet computer, laptop computer, smartcard, entertainment device, smart appliance, etc. Storing data securely such that it resists attackers that have physical access to the device has been typically protected by a password or passcode that is fed into a key derivation function to produce a symmetric encryption key that is then used to encrypt the secret information. For example, this technique is used for full disk encryption, key storage on a smartcard, by password managers and key migration containers.

However, users are generally expected to remember multiple passwords or passcodes and keep straight which password goes with encrypted storage object or resource. Studies show that users reach cognitive overload quickly which limits effectively the number of encrypted storage resources they can manage. Further, a centralized solution may not satisfy user needs because it may require the user to identify a single entity that interoperates with every other service, application, or device that may use encrypted storage.

BRIEF DESCRIPTION OF THE DRAWINGS

FIG. 8 illustrates an embodiment of a third logic flow.

DETAILED DESCRIPTION

Figure 1:
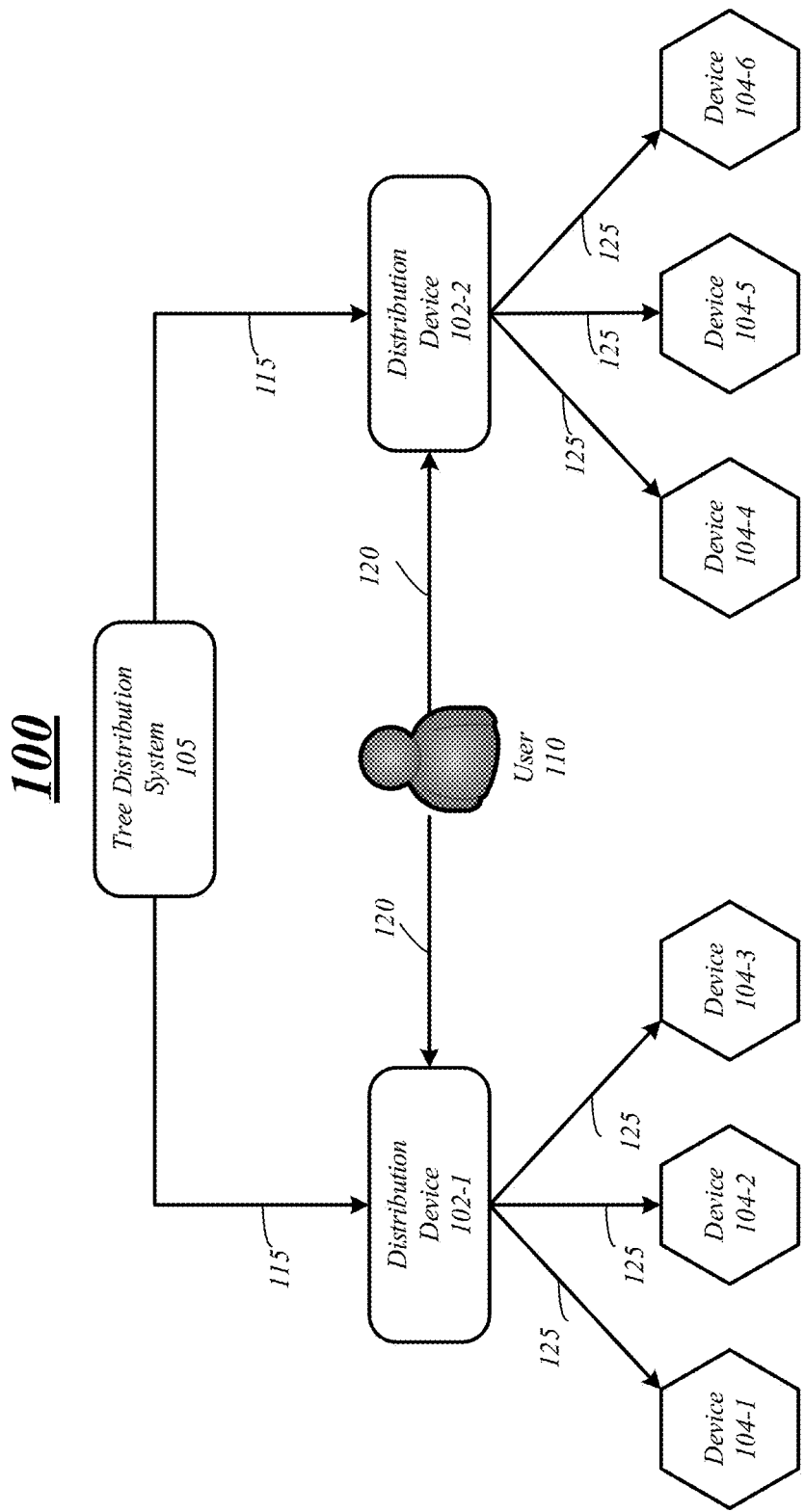
FIG. 1 illustrates an embodiment of a computing system.

Various embodiments are directed to systems, devices, methods and techniques to distribute one or more share values of a secret value to a plurality of devices by distribution devices. The share values may be generated by the distribution devices based on a polynomial function including one or more polynomial elements including a secret value. The secret value may be received from a user of the system, device, apparatus and the other polynomial elements may be generated by using a node value of pseudo random number generator tree as a seed value for a random number generator, such as Intel's® Digital Random Number Generator (DRNG). As will be discussed in more detail below, the polynomial function including the generated polynomial elements and secret value may be used to generate the share values by using random numbers, device identification numbers, or derivation values of the device identification numbers as input values for the polynomial function. Further, each input value is processed using the polynomial function and the output of the polynomial function is a share value.

In some embodiments, two or more distribution devices may distribute share values for the same secret value by independently generating at least a portion of the same pseudo random number generator tree to generate the polynomial function. In other words, the same polynomial function may be generated on at least two different distribution devices. Further, each of the distribution devices may distribute a unique share value to a number of devices based on using random numbers as input values, device identification, or a derivation of the device identification as an input value for the polynomial function.

Moreover, the pseudo random number generator tree may be replicated on a number of distribution devices by using a common seed value and a decomposable contextual data type, such as a time. For example, the distribution devices may be provisioned with a randomly generated seed value that then may be used to produce a pseudo random number generator tree corresponding to hours of the day, days of the week, months of the year, and so forth. Each of the pseudo random number generator trees may be independently generated once a decomposable contextual data type is agreed upon by the distribution devices. Further and as will be explained in more detail below, the distribution devices may generate different portions of a pseudo random number generator tree based on the seed value they receive. Thus, more secure distribution devices may generate more of the pseudo random number generator tree, while less secure distribution devices may generate a smaller portion of the tree.

Once at least a portion of a pseudo random number generator tree is generated on the distribution devices, they may independently generate share values for the same secret value. More specifically, each distribution device may periodically or semi-periodically generate the same polynomial function having the same polynomial elements based on the pseudo random number generator tree, and thus may be able to generate share values for the same secret value. The share values may then be distributed to a number of devices and a subset of share values may be used to reconstruct the secret value if desired. These and other details will become more apparent with the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a computing system 100 consistent with embodiments described herein. The computing system 100 may include any number of devices coupled with one another via one or more connections, such as connections 115, 120 and 125 which may be any combination of wired or wireless connections. In some embodiments, computing system 100 may include a tree distribution system 105 coupled with a first distribution device 102-1 and a second distribution device 102-2. Further, the distribution devices 102-1 and 102-2 may be coupled with any number of devices, such as devices 104-1 through 104-6. Devices 104-1 through 104-6 may be any type of computing device including, but not limited, a mobile computing device, a mobile cellular phone, a personal digital assistant, a laptop computing device, a tablet computing device, a touchscreen computing device, a workstation, and so forth. Further and although FIG. 1 only illustrates a limited number of distribution devices 102 and devices 104, embodiments may include any number of distribution devices and devices.

The computing system 100 may be used by a user 110 to share a secret value, such as a passcode, password, a cryptographic key, or any secret data across multiple devices. Moreover, the secret value may be a number, a bit string, an ASCII coded text or other representations that can be converted into a sequence of numbers and may be divided into a number of share values using a secret sharing scheme. The secret value may be used by the user 110 across multiple devices to secure information, data and resources while maintaining a high level of security. For example, the secret value may be used for full disk encryption for a storage device such as a hard drive, a memory unit, a smart card, and so forth. In some embodiments, the secret value may be used a wrapper to secure other key values, such as when using an archive file format standard or public key cryptography standard. In another example, the secret value may be a root value or a node value that may be used as a seed value to generate a random number generator tree or portion thereof. These and other details will become more apparent with the following description.

When determining and generating the a share value associated with the secret value, the computing system 100 may utilize a pseudo randomly or truly randomly generated pseudo random number generator tree to generate one or more polynomial elements for a polynomial function. The polynomial function including a secret value and the generated polynomial elements may be used to generate one or more share values for a secret value that may be distributed to other devices, such as devices 104-1 through 104-6. Since a pseudo random number generator tree is used, the polynomial elements and polynomial function may be replicated on plurality of distribution devices, such as distribution devices 102-1 and 102-2. More specifically, the pseudo random number generator tree may be replicated by distribution devices by using a same seed value for generation. Thus, multiple distribution devices may generate share values for a secret value that may be used to recreate the secret value. In another words, share values associated with the same secret value may be distributed by two or more distribution devices. These and other details will become more apparent with the following description.

The computing system 100 may include a tree distribution system 105 which may be any device, component, module or so forth, and may be used to distribute seed values for use in generating pseudo random number generator trees by the distribution devices 102-1 and 102-2. The seed values may be a root value or node value that may have been generated by a random number generator, such as Intel's® Digital Random Number Generator (DRNG), a pseudo random number generator, or the like.

The root value can be used as a seed value to generate pseudo random numbers of a pseudo random number generator tree having a hierarchical structure with a number of levels or branches each having a number of node values. The pseudo random number generator tree may have any number of levels having node values, which may be used as seed values to generate additional lower levels and node values. In other words, a node value may be used as a seed value to generate the next level down on the pseudo random number generator tree. Thus, the root value can be used to generate the entire pseudo random number generator tree and the node values can be used to generate a portion of the pseudo random number generator tree.

The seed value may be used to seed a random number generator and by using a seed value the pseudo random number generator tree may be replicated any number of times. For example, the tree distribution system 105 may communicate or send a seed value, such as the root value or one of the node values to the distribution devices 102-1 and 102-2. The root value or one of the node values can be used by the distribution devices 102-1 and 102-2 to generate the same pseudo random number sequence of random numbers in a pseudo random number generator tree. If the root value is distributed to the distribution devices, the entire pseudo random number generator tree may be replicated or generated by the distribution devices 102-1 and 102-2. In some embodiments, a node value may only be sent to the distribution devices 102-1 and 102-2 for security purposes and to limit the replication of the entire pseudo random number generator tree.

The distribution devices 102-1 and 102-2 can use a seed value and a decomposable contextual data type, such as a time to generate the same pseudo random number sequence. The time may be a year value (2014, 2015, 2016, and so forth), a month value (1 through 12), a day value (1 through 31), an hour value (1 through 24) and so on and any combination thereof. By way of illustration, the distribution devices 102-1 and 102-2 may receive the seed value from the tree distribution system 105 and may generate pseudo random number values on a yearly basis, a monthly basis, a daily basis, an hourly basis, and so forth. In other words, each distribution device 102-1 and 102-2 will generate the same pseudo random value for a particular year, month, day, hour, and so forth when starting with the same seed value. As will be discussed in more detail below, the distribution devices 102-1 and 102-2 may use a node value as a seed value to generate polynomial elements for a polynomial function to generate and distribute share values.

In some embodiments, the tree distribution system 105 may be used during an initialization process. For example, the tree distribution system 105 may initialize the distribution devices 102-1 and 102-2 by validating the distribution devices through a validation process and communicating at least one seed value (e.g. a root value or a node value) to the distribution devices 102-1 and 102-2. In some embodiments, the tree distribution system 105 may distribute different seed values or node values for different levels of a pseudo random number generator tree to different distribution devices. For example, a more "secure" distribution device may receive a seed value higher in the hierarchical structure than a "less" secure distribution device. Therefore, the distribution device receiving the seed value higher in the hierarchical structure can recreate more of the pseudo random number generator tree. Once initialized, the distribution devices 102-1 and 102-2 may be used to distribute share values to devices. In some embodiments, the distribution devices 102-1 and 102-2 may be used to distribute a number of share values corresponding to number of different secret values. Various embodiments are not limited in this manner.

In some embodiments, the tree distribution system 105 may create a new pseudo random number generator tree and distribute it to the distribution devices 102-1 and 102-2. For example, if a pseudo random number generator tree is believed to be compromised, the tree distribution system 105 can generate a new pseudo random number generator tree. In another example, the tree distribution system 105 may generate a new pseudo random number generator tree on a periodic or semi-periodic basis, e.g. yearly, monthly, daily, and so forth. Various embodiments, are not limited to these examples and the tree distribution system 105 can generate a new pseudo random number generator tree at other times, e.g. upon the receiving a user request.

As illustrated in FIG. 1, a computing system 100 may include distribution devices 102-1 and 102-2. The distribution device 102-1 and 102-2 can be any type of computing device or system capable of generating and distributing a share value of a secret value to another device, such as devices 104-1 through 104-6. In some embodiments, the distribution devices 102-1 and 102-2 may be a battery charging station, such as a charging pad, a charging bowl, or any other type of device capable of charging another device via radio frequency, induction, universal serial bus (USB), local area network (LAN), etc. The distribution devices 102-1 and 102-2 can distribute a share value for a secret share while the devices 104-1 through 104-6 are charging, for example. Various embodiments are not limited in this manner.

A share value may be associated with a secret value and may be used with other share values to recreate the secret value. For example, a (3, 6) secret sharing threshold scheme may be selected and at least 3 share values out of 6 distributed share values may be used to recreate the secret value. In another example and for a more secure secret sharing scheme, a (6, 6) secret sharing threshold scheme may be selected and all 6 distributed share values are needed to recreate the secret value.

In some embodiments, the distribution devices 102-1 and 102-2 may generate a number of unique share values using the pseudo random number generator tree for the same secret value. Thus, each distribution device 102-1 and 102-2 may distribute a unique share value to a particular device relating to the same secret value. Moreover, each device 104-1 through 104-6 may receive a unique and different share value for the same secret value via either of the distribution devices 102-1 and 102-2. As will be discussed below, each share value can be used to recreate a secret value.

In embodiments, the distribution devices 102-1 and 102-2 may use the pseudo random numbers (i.e. node values) of the pseudo random number generator tree as seed values to generate polynomial elements $a_1$ through $a_k$ for the polynomial function $f(x)=a_0+a_1x+a_2x^2+a_3x^3+\ldots a_{k-1}x^{k-1}$, where k equals a number of share values required to reconstruct a secret value $a_0$. Once polynomial elements are generated and the secret value is received, the polynomial function f(x) can be used to generate the share values, i.e. a share value $_{x-1}=(x, f(x)$ mode p) associated with the secret value $a_0$, where p equals a well-known public large prime number. The number of share values required to reconstruct a secret value may be determined by a user of the system, a factory default setting, predetermined, and so forth, and is some number less than or equal to the total number of share values required for distribution by computing system 100.

By way of example, assuming that the desired number of share values required to reconstruct the secret value is three and FIG. 1 illustrates six devices 104-1 through 104-6 to receive a share value of a secret value. Therefore, six unique share values are needed and this is an example of a (3, 6) secret sharing threshold scheme where any combination of three share values of the six total share values may be used to reconstruct the secret value.

In this example and for illustrative purposes, the secret value may be 1234. Various embodiments are not limited in this manner and the secret value may be any value and may have been previously communicated to the distribution devices 102-1 and 102-2 by a user 110 via connections 120 or some other means.

The distribution devices 102-1 and 102-2 may use the pseudo random number generator tree to select a seed value to generate polynomial elements for the polynomial function f(x) based on a decomposable contextual value, such as a time value. For example, a seed value based on the pseudo random number generator tree for the year, month, day and hour value of Sep. 15, 2014 at 8:00 AM EDT may be used by a random number generator to generate polynomial elements for the polynomial function f(x). Since each distribution devices 102-1 and 102-2 have at least a portion of the same pseudo random number tree, the same seed value may be picked based on the decomposable contextual value. Thus, each distribution device 102-1 and 102-2 may generate the same polynomial elements by using the same seed value for a polynomial function.

The number of polynomial elements for a polynomial function f(x) is based on the desired number of share values required to reconstruct the secret value and is (k−1). Thus in this example, three share values are desired to reconstruct the secret value and two polynomial elements a1 and a2 are selected for the polynomial function f(x). The value $a_0$ is never used because it is the secret value. For this example, we will use 188 for polynomial element $a_1$ and 104 for polynomial element $a_2$ and therefore the polynomial function $f(x)=1234+188x+104x^2$ is used to generate the six share values for distribution. Since each of the distribution devices 102-1 and 102-2 have at least a portion of the same pseudo random number generator tree, the distribution devices 102-1 and 102-2 may generate the same polynomial function $f(x)=1234+188x+104x^2$ to generate the share values associated with the secret value for distribution to the devices 104-1 through 104-6.

FIG. 1 illustrates distribution device 102-1 coupled with devices 104-1 through 104-3 and distribution device 102-2 coupled with devices 104-4 through 104-6. Therefore, each of the distribution devices 102-1 and 102-2 will generate three share values for the devices 104-1 through 104-6 in this embodiment. Thus, each distribution devices 102-1 and 102-2 selects three input values x to generate the share values using f(x). For example, input values 1, 2, 3, 4, 5 and 6 may be used to generate share values 1526, 2026, 2734, 3650, 4774, and 6106, respectively using the polynomial function f(x) previously discussed. However, various embodiments are not limited in this manner. For example and as previously mentioned, when generating the share values, modular arithmetic using a known prime number may be used to generate the share values. For example, a share value may equal f(x) mod p, where p is a known prime number chosen between the distribution devices, and x is a random number, a device identification, or some derivation of the device identification. Modular arithmetic may be used to prevent a person or attacker from determining the secret value from a subset of share values less than the number chosen for the secret sharing threshold scheme.

Each device 104-1 through 104-6 must receive a different and unique share value. Therefore, in some embodiments the distribution devices 102-1 and 102-2 may use a random number generator to select each input value when generating the share values to ensure that the same input value is not chosen more than once to generate share values. By using a random number generator to select the input values, the distribution devices 102-1 and 102-2 may select different input values without communicating with each other and ensuring that different values are distributed to each of the devices 104-1 through 104-6.

In another example, the distribution devices 102-1 and 102-2 may a device identification for the devices receiving the share value. More specifically, each device receiving a share value may have a unique device identification that may be used as an input value to generate a share value. In some embodiments, a derivation value for a device identification may be used as an input value. A value may be derived from the device identification so that the device identification is not communicated between the device and a distribution device.

In some embodiments, the distribution devices 102-1 and 102-2 may verify and validate each of the devices 104-1 through 104-6 before communicating the share value to them. For example, the distribution devices 102-1 and 102-2 may have a security module such as Intel's® Trusted Platform Module (TPM) or any other type of security module and each device 104-1 through 104-6 may have a unique device identification. The distribution devices 102-1 and 102-2 may validate each of the devices 104-1 and 104-6 before communicating a share value to prevent a rogue device from receiving one or more of the share values and being able to reconstruct the secret value.

In some example embodiments, the distribution devices 102-1 and 102-2 may use a Diffie-Hellman key exchange to verify that each of the devices 104-1 through 104-6 is not a rogue device prior to communicating the share value to them. Further, a Diffie-Hellman key exchange may be used to prevent a man-in-the-middle attack and the like. The distribution devices 102-1 and 102-2 may share a network-wide shared identification "z" defining the resource that is being protected by the secret value. The distribution devices 102-1 and 102-2 may keep z secret while distributing each devices 104-1 through 104-6 with $g^z$ mod p, where g is a public prime base and p is a public prime number.

Each of the devices 104-1 through 104-6 may perform a hash operation on $g^z$ mod p with its own secret unique device identification d to produce a network specific device identification value $d_z$. Each of the devices provides distribution device 102-1, distribution device 102-2, or both $g^{dz}$ mod p to prove to the distribution device 102-1 and/or distribution device 102-2 that it calculated the hash operation legitimately. The devices 104-1 through 104-6 and the distribution devices 102-1 and 102-2 may secretly calculate $x_d = g^{(z*dz)}$ mode p and the distribution devices 102-1 and 102-2 may send to each of the devices the device identification=f ($x_d$) mod p.

As previously mentioned, since each of the devices 104-1 through 104-6 have a unique device identification it or a derivation thereof may be used by the distribution devices 102-1 and 102-2 as an input value to generate a share value for the corresponding device by using it as the x value in (x, f(x) mod p) previously discussed above. In some embodiments, the distribution devices 102-1 and 102-2 may combine the device identification of a device 104 with a random value prior to generating the share value using f(x) mod p. By using the unique device identification or derivation thereof, the distribution devices 102-1 and 102-2 may ensure that the same share value is not generate and distributed to two or more different devices 104-1 through 104-6.

Figure 2:
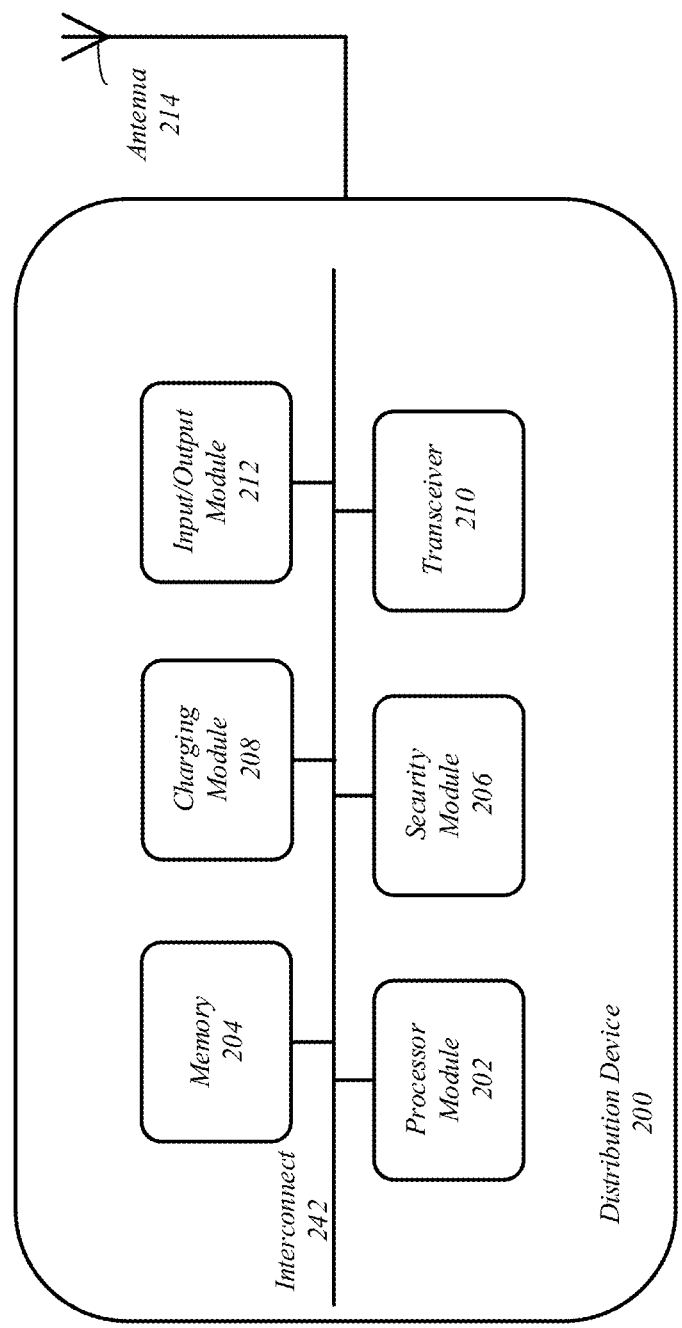
FIG. 2 illustrates an embodiment of a distribution device.

FIG. 2 illustrates an embodiment of a distribution device 200 which may be the same as the distribution devices 102-1 and 102-2 discussed above with respect to FIG. 1. For example, the distribution device 200 may include any number of modules, components and circuitry to store seed values, pseudo random number generator trees or portions therefore, secure device identifications and instructions to generate share values for a secret value. In addition, the distribution device 200 may perform instructions and operations to generate and distribute the share values among a plurality of coupled devices in a system that includes a plurality of distribution devices, such as computing system 100 of FIG. 1. In some embodiments, the distribution device 200 may also include charging components and/or modules to perform a charging operation for the plurality of coupled devices. For example, the distribution device 200 may be a battery charging station, such as a charging pad, a charging bowl, or any other type of device capable of charging another device via radio frequency, induction, universal serial bus (USB), local area network (LAN), etc.

In various embodiments, distribution device 200 may include a processor module 202. Processor module 202 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processing circuitry, processor or processing circuit on a single chip or integrated circuit. The processor module 202 may be connected to and communicate with the other elements of the computing system via an interconnect 242, such as one or more buses, control lines, and data lines.

The distribution device 200, in embodiments, may include a memory 204 to couple to processor module 202. Memory 204 may be coupled to processor module 202 via interconnect 242, or by a dedicated communications bus between processor module 202 and memory 204, as desired for a given implementation. Memory 204 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 204 can store data momentarily, temporarily, or permanently. The memory 204 stores instructions and data for distribution device 200. The memory 204 may also store temporary variables or other intermediate information while the processor component 202 is executing instructions. The memory 204 is not limited to storing the above discussed data; the memory 204 may store any type of data.

The distribution device 200 may also include a security module 206 which may be a trusted platform module (TPM) that may implement a trusted execution environment (TEE) and secure software extensions, such as Intel's® Software Guard Extensions® (SGX), Intel's® common sub-expression elimination instructions, or ARM's® TrustZone®, and so forth. The security module 206 may be used by the distribution device 200 to validate and verify one or more devices coupled to the distribution device 200, such as a device to receive a share value of a secret value. In some embodiments, the security module 206 may exchange a coupled device's device identification using a Diffie-Hellman technique, as previously discussed.

In some embodiments, the distribution device 200 may include one or more charging modules 208 that may be used to charge coupled device. In various embodiments, a charging module 208 may include circuitry to provide power and charge a coupled device via radio frequency, induction, USB, RS-232, LAN connection, or any other means that may be used to provide power to a device. For example, in some embodiments the distribution device 200 may be a charging bowl that may include a number of charging coils that may provide power to one or more devices located in the charging bowl via induction. However, various embodiments are not limited in this context.

In various embodiments, distribution device 200 may include a transceiver 210. Transceiver 210 may include one or more radios capable of transmitting and receiving signals and information using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, Bluetooth®, near field communication (NFC) and satellite networks. In communicating across such networks, transceiver 210 may operate in accordance with one or more applicable standards in any version, such as IEEE® 802.11 and Bluetooth®. The embodiments are not limited in this context.

Transceiver 210 may be coupled with an antenna 214 for reception and transmission of information, messages, packets, frames and so forth between other devices. In some embodiments, transceiver 210 may include a transmitter and a receiver to allow transmission and reception of data between the distribution device 200 and a remote location. The transmitter and receiver may be combined into the transceiver 210. The antenna 214 may be attached to or coupled with the distribution device 200 and electrically coupled to the transceiver 210. The distribution device 200 may also include (not shown) multiple transmitters, multiple receivers, multiple transceivers, and/or multiple antennas. In some embodiments, the transceiver 210 and antenna 214 may communicate, validation information, verification information, and secret information such as a share value to another device.

Distribution device 200 may include one or more Input/Output (I/O) modules 212, in some embodiments. Examples of I/O module 212 may include Universal Serial Bus (USB) ports/adapters, IEEE 1394 Firewire ports/adapters, and so forth. The I/O module 212 may include one or more input devices such as, a keyboard, keypad, number pad, touchscreen device, a microphone, a or any other type of device that may be used to input data and information into the distribution device 200. Further, the I/O module 212 may include any number of output devices, such as monitor, display, touchscreen display, a haptic feedback device, one or more speakers and so forth. The embodiments are not limited in this context.

Figure 3A:
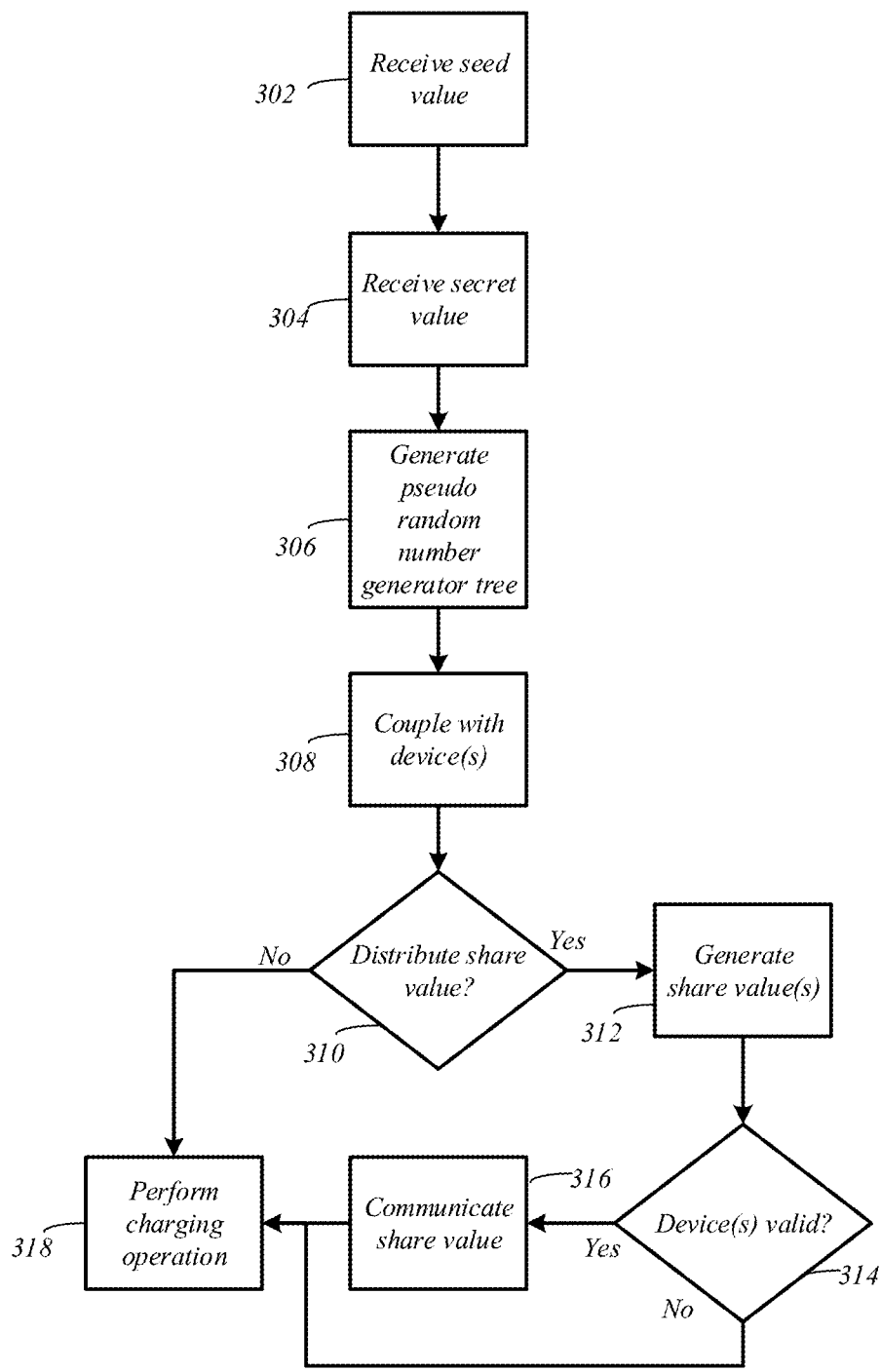
FIG. 3A illustrates an embodiment of a first logic flow.

FIG. 3A illustrates an embodiment of a first logic flow 300 that may be performed by one or more components and modules of a distribution device, such as a distribution device 102 in FIG. 1 and distribution device 200 in FIG. 2.

In various embodiments, logic flow 300 may be one embodiment for distributing share values among a plurality of devices. Various embodiments are not limited in this manner and other embodiments may contemplate distributing a share value to devices in some other manner.

At block 302, a distribution device may receive a seed value for a pseudo random number generator. In some embodiments, the distribution device may receive the seed value as part of an initialization operation performed when the distribution device is first initialized on a system. The distribution device may also receive the seed value periodically or semi-periodically based on a default or user setting to update the pseudo random number generator with new values.

The seed value may be a root value or a node value of a pseudo random number generator tree. For example, a distribution device may receive a root value as a seed value and the distribution device may be use the root value to generate an entire pseudo random number generator tree. In another example, the distribution device may receive a node value as a seed value and use the node value to generate a portion of the of the pseudo random number generator tree, such as all the other node values on the same level and a lower levels.

In some embodiments, the distribution device may receive the seed value along with other information including a description of the seed value and time for the seed value. The description may provide some detail to the receiving distribution device as to whether the seed value is a root value, a node value, and so forth. For example, the description may include information indicating that the seed value is a node value for a specific year, month, and hour. In another example, the description may include information indicating that the seed value is for a different month and hour, but in the same year. Various embodiments are not limited in this manner.

Further, the seed value may also be received with time information indicating a time when the seed value was sent by a tree distribution system. The time information may be used by the distribution device to ensure that it is using the correct seed value when generating the pseudo random number generator tree.

At block 304, the distribution device may receive a secret value from a user and/or another device. As previously discussed, the secret value may be any number, symbol, character, and so forth that may be used to secure information and data. For example, the secret value may be a password or passcode for full disk encryption, a password for a smartcard, or a seed value (i.e. a root value or a node value) for a pseudo random number generator tree.

In some embodiments, the logic flow 300 may include generating a pseudo random number generator tree, or at least a portion thereof by a distribution device at block 306. The distribution device may generate the tree using the seed value received above. As previously mentioned, if the distribution device receives the root value as the seed value it may generate the entire pseudo random number generator tree. However, if the distribution device receives a node value as the seed value it may only generate a portion of the pseudo random generator tree having values on equal or lower levels.

At block 308, the distribution device may couple with a device, such as a smartphone, laptop computer, cellular phone device, or any other computing device to perform charging operations. The distribution device may couple with the device through a wired connection, a wireless connection, or both. For example, the distribution device may couple with the device via a USB connection and/or via a radio frequency communication. Further and at block 310, the distribution device may determine whether a new share value is to be shared with the coupled device. If not, the distribution device may perform a charging operation with the device at block 318 by providing power through the connection. In some embodiments, the distribution device may perform the charging operation as soon as the device couples with the distribution device. Various embodiments are not limited in this manner.

In one or embodiments, the distribution device may determine that a share value is to be distributed to the device based on whether a new share value is to be generated since the last time the device was coupled with the distribution device. For example, a user setting or default setting may dictate that a new share value for a secret value is to be generated on a periodic, semi-periodic or non-periodic basis. In some embodiments, a share value may be generated based on a decomposable contextual data type, such as a time. For example, a share value may be based on a time including a combination of one or more of a year, month, day, hour, and so forth. If the distribution device determines that the device is to receive a new share value, it may generate a new share value for the device at block 312. In some embodiments, the distribution device may generate a number of unique share values for the secret value for each device that is to receive a share value.

The distribution device may generate a unique share value for each device using polynomial elements for a polynomial function based on a value of the pseudo random number generator tree and the decomposable contextual data type. For example, the distribution device may generate polynomial elements by using a node value at a specific time or location as seed value in a random number generator. The generated polynomial elements along with a secret value may be used to create a polynomial function. Further, the polynomial function may be used to generate share values by randomly or pseudo randomly selecting input values for the polynomial function, as previously discussed. In some embodiments, the input values may be randomly generated using a random number generator, or may be based on a device identification used to validate the device at decision block 314.

As mentioned, the logic flow 300 may include validating a device at block 314 by the distribution device. The distribution device may validate the device in any manner including receiving a device identification or derivation thereof from the device and validating the device identification using a Diffie-Hellman technique as previously discussed. If the device is not validated, the distribution device may continue to perform a charging operation for the device at block 318, but will not distribute a share value to the device. However, if the device is valid the distribution device will communicate the share value to the device at block 316 and continue to perform the charging operation for the device at block 318. In various embodiments, blocks 302 through 318 may be repeated any number of times, such as each time a device is coupled with the distribution device.

Figure 3B:
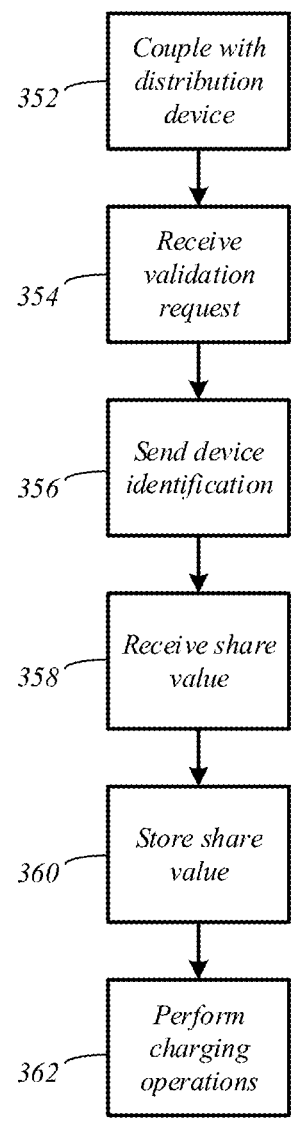
FIG. 3B illustrates an embodiment of a second logic flow.

FIG. 3B illustrates an embodiment of a second logic flow 350 that may be performed by device receiving a share value associated with a secret value. In various embodiments, the device may be any type of device including a smartphone, a laptop computer, a cellular device, a personal digital assistant, a notebook computer, or any other type of device. The device may include any number of components to process information, including receiving and sending information over a wired or wireless connection. In some embodiments, the device may be a battery operated device and may periodically require recharging.

In some embodiments, the logic flow 350 may include the device coupling with a distribution device at block 352. The device may couple with the device via one or more wired or wireless connections. For example, the device may be inductively connected with the distribution device. In another example, the device may be coupled with the distribution device via radio frequency. In a third example, the device may be coupled with the device via a USB wire or cable. Various embodiments are not limited to these examples. In some embodiments, the device may be coupled with the distribution device in more than one manner. For example, the device may be coupled with the distribution device inductively to receive power and via radio frequency to receive information and data.

At block 354, the device may receive a validation request to send a form of identification, such as a device identification to the distribution device to be validated. Further and at block 356, the device may send a device identification or derivation thereof to the distribution device for validation by the distribution device. The device identification may be any type of information to identify the device and may be communicated to the distribution device in any secure manner, such as using a key exchange technique, as previously discussed.

In some embodiments, the device may receive a share value at block 358 if it is validated by the distribution device. The share value may be value generated by the distribution device for a secret value that when combined with some number of other share values the secret value may be determined. The share value may be generated from a polynomial function using polynomial elements generated from a seed value of a pseudo random number generator tree based on a decomposable contextual value. In some embodiments, the share value may be sent to the device in a secure manner using known secure technique for communicating information between devices.

At block 360, the device may store the share value in memory. In some embodiments, the device may store the share value in a secure location using one or more security mechanisms. In addition, the device may store multiple share values, each for a separate secret value. The share values may be identify in memory based on the secret value it is associated with.

The logic flow 350 may also include the device performing a charging operation at block 362. More specifically, the device may receive power from the distribution device to charge a battery or power source. The power may be received using any power transfer technique, such as induction, radio frequency, via cable, and so on. In some embodiments, the device may start receiving power from the distribution device as soon as it coupled with the distribution device. Various embodiments are not limited in this manner and the blocks of FIG. 3B may be performed any number of different ways.

Figure 4:
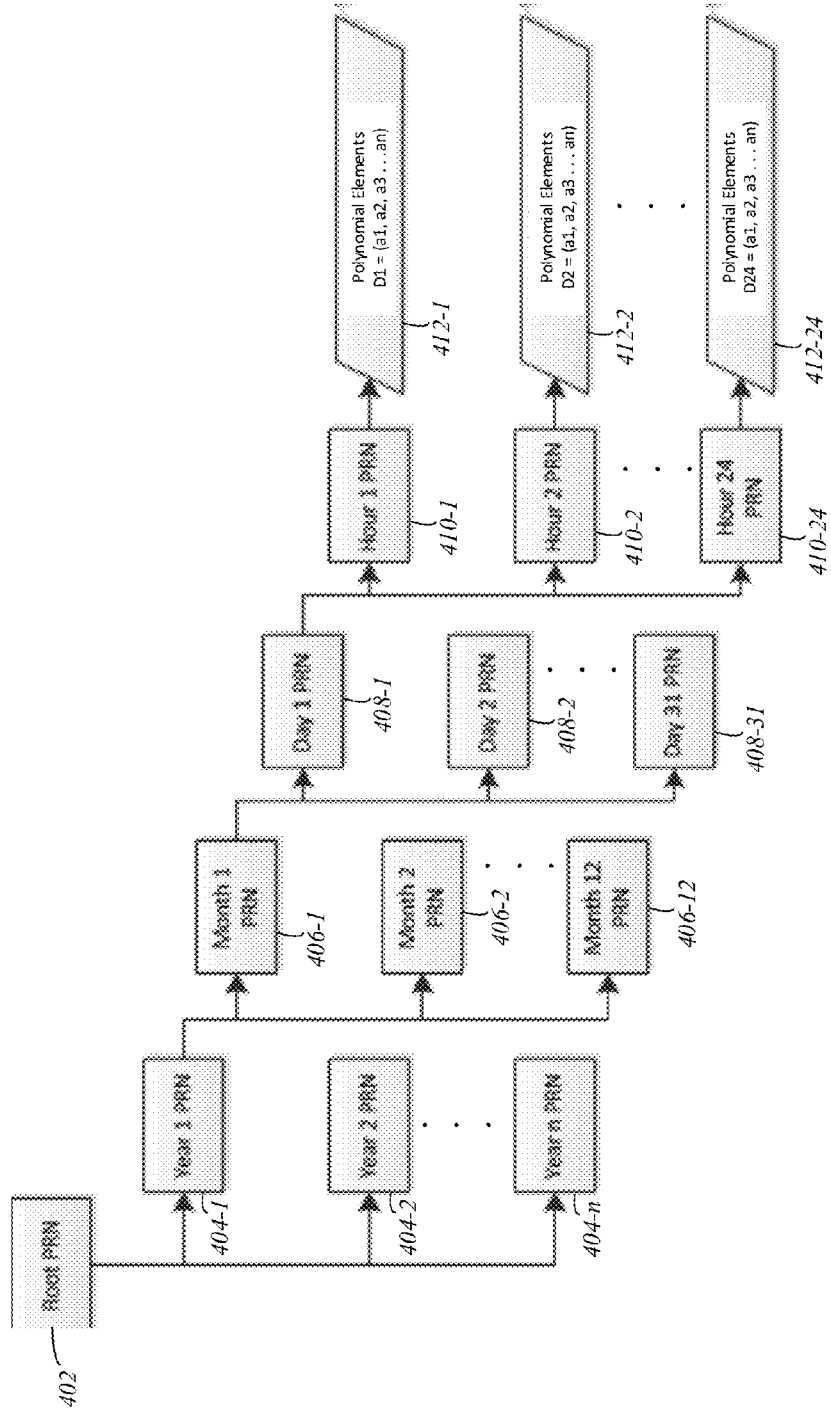
FIG. 4 illustrates an embodiment of a pseudo random number generator tree.

FIG. 4 illustrates an embodiment of a pseudo random number generator tree 400 that may be used to generate polynomial elements. The pseudo random number generator tree 400 may include a root value 400 and any number of node values 404, 406, 408 and 410. The node values 404, 406, 408 and 410 may further be defined as a year node value 404, a month node value 406, a day node value 408, and an hour node value 410 in this example embodiment.

Various embodiments are not limited in this manner and the pseudo random number generator tree 400 may include minute node values, second node values and so forth.

The root value 400 may be used by a distribution device to generate an entire pseudo random number generator tree. In some embodiments, two or more distribution devices may be able to generate the same pseudo random number generator tree based on the same root value. For example and with reference to FIG. 1, distribution devices 102-1 and 102-2 may receive root value 402 from tree distribution system 105 and each generate pseudo random number generate tree 400 separately, by using the root value 402 as a seed value for a random number generator. In some embodiments, a distribution device may use a node value to generate a portion of a pseudo random number generator tree. In another example, the distribution devices 102-1 and 102-2 may receive year node value 404-1 to use as a seed value to generate a portion of the pseudo random number generator tree 400 including all the other node values on lower levels of the tree.

The node values may also be used as seed values to generate polynomial elements, such as polynomial elements 412 in the pseudo random number generator tree 400. By way of example, the distribution devices 102-1 and 102-2 may have an agreed upon setting to generate polynomial elements for a polynomial function, such as f(x) on an hourly basis based on a decomposable contextual data type. The distribution devices 102-1 and 102-2 may use the hour node value 410-1 which is based on the root value 402, the year value 404-1, the month value 406-1 and the day value 408-1 as a seed value for a random number generator to generate polynomial elements 412-1. In another example, hour node value 410-2 based on the same day node value 408-1, month node value 406-1, year node value 404-1 and root value 402 as discussed in the previous example may be used as a seed value to generate polynomial elements 412-2. The distribution devices 102-1 and 102-2 may generate polynomial elements 412 using every hour node value 410 based on a predetermined or preset configuration or some other user setting. In some embodiments, the distribution devices 102-1 and 102-2 may generate polynomial elements daily and may use the daily node values 408 as seed values to generate polynomial elements. Various embodiments are not limited in this manner and any node value or root value may be used as a seed value to generate polynomial elements.

Further and as previously discussed, the polynomial elements, such as polynomial elements 412-1 may be elements of a polynomial function f(x). The polynomial function f(x) including generated polynomial elements and a secret value may be used to generate share values to distribute to devices. The number of polynomial elements generated may be based on the number of share values that need to be generated and/or the number of devices required to determine the secret value from the share values. For example, if a user, administrator, factory setting, or default setting determines that three share values are needed to reconstruct a secret value, the number of polynomial elements required for generation is two. More specifically, the number of polynomial elements required for a polynomial function is (k−1) where k is the number of share values required to reconstruct the secret value. For secret values that have a higher importance, a user or administrator may require more share values to reconstruct a secret value than secret values having a lower importance. For example, if the secret value is a non-terminal node value to generate a portion pseudo random number generator tree, all of the devices to receive a share value may be required to generate the secret value.

Figure 5:
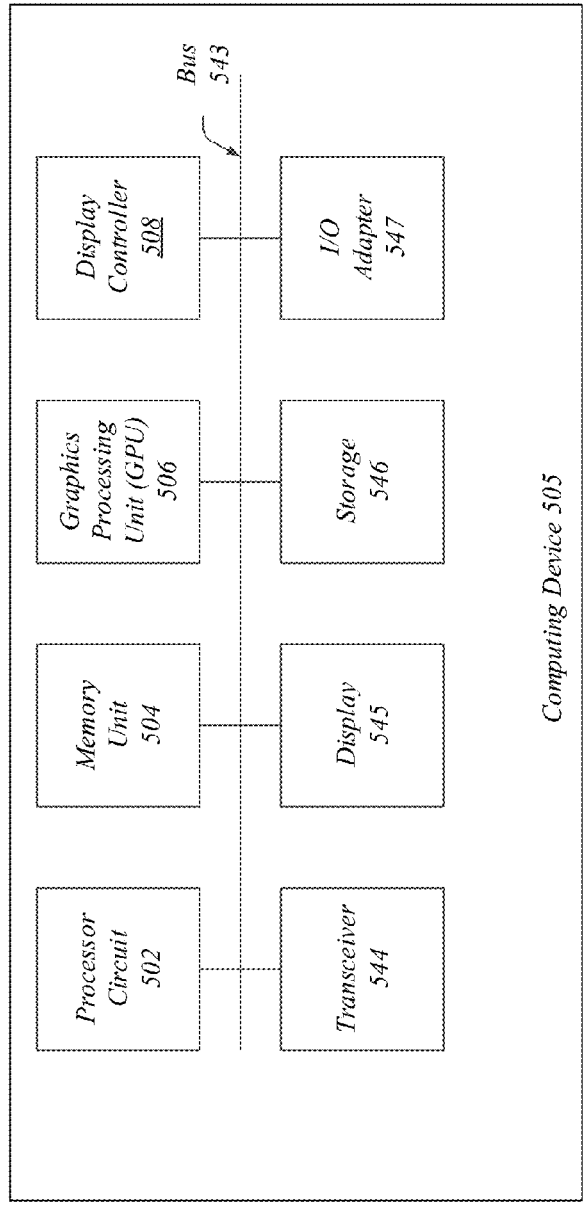
FIG. 5 illustrates an embodiment of a computing system.

FIG. 5 illustrates one embodiment of a system 500. In various embodiments, system 500 may be representative of a system or architecture suitable for use with one or more embodiments described herein, such as devices 104-1 through 104-6, and logic flow 350 of FIG. 3B. The embodiments are not limited in this respect.

As shown in FIG. 5, system 500 may include multiple elements. One or more elements may be implemented using one or more circuits, components, registers, processors, software subroutines, modules, or any combination thereof, as desired for a given set of design or performance constraints. Although FIG. 5 shows a limited number of elements in a certain topology by way of example, it can be appreciated that more or less elements in any suitable topology may be used in system 500 as desired for a given implementation. The embodiments are not limited in this context.

In various embodiments, system 500 may include a computing device 505 which may be any type of computer or processing device including a personal computer, desktop computer, tablet computer, netbook computer, notebook computer, laptop computer, server, server farm, blade server, or any other type of server, and so forth.

In various embodiments, computing device 505 may include processor circuit 502. Processor circuit 502 may be implemented using any processor or logic device. The processing circuit 502 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 502 may be connected to and communicate with the other elements of the computing system via an interconnect 543, such as one or more buses, control lines, and data lines.

In some embodiments, processor circuit 502 may include one or more secure modes of operation. For example, the processor circuit 502 may include circuitry to perform secure extensions, such as Intel's® SGX or virtualization instructions, such as Intel's® VT-x. Further, the computing device 505 may include a separate security module (not shown) which may be a trusted platform module (TPM) that may implement a trusted execution environment (TEE) and secure software extensions, such as Intel's® Software Guard Extensions® (SGX), Intel's® common sub-expression elimination instructions, or ARM's® TrustZone®, and so forth. Various embodiments are not limited in this manner.

In one embodiment, computing device 505 may include a memory unit 504 to couple to processor circuit 502. Memory unit 504 may be coupled to processor circuit 502 via communications bus 543, or by a dedicated communications bus between processor circuit 502 and memory unit 504, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 505 may include a graphics processing unit (GPU) 506, in various embodiments. The GPU 506 may include any processing unit, logic or circuitry optimized to perform graphics-related operations as well as the video decoder engines and the frame correlation engines. The GPU 506 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 506 may process any type of graphics data such as pictures, videos, programs, animation, 3D, 2D, objects images and so forth.

In some embodiments, computing device 505 may include a display controller 508. Display controller 508 may be any type of processor, controller, circuit, logic, and so forth for processing graphics information and displaying the graphics information. The display controller 508 may receive or retrieve graphics information from one or more buffers. After processing the information, the display controller 508 may send the graphics information to a display.

In various embodiments, system 500 may include a transceiver 544. Transceiver 544 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, transceiver 544 may operate in accordance with one or more applicable standards in any version. The embodiments are not limited in this context.

In various embodiments, computing device 505 may include a display 545. Display 545 may constitute any display device capable of displaying information received from processor circuit 502, graphics processing unit 506 and display controller 508.

In various embodiments, computing device 505 may include storage 546. Storage 546 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 546 may include technology to increase the storage performance enhanced protection for valuable digital media when multiple hard drives are included, for example. Further examples of storage 546 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 505 may include one or more I/O adapters 547. Examples of I/O adapters 547 may include Universal Serial Bus (USB) ports/adapters, IEEE 1394 Firewire ports/adapters, and so forth. The embodiments are not limited in this context.

Figure 6:
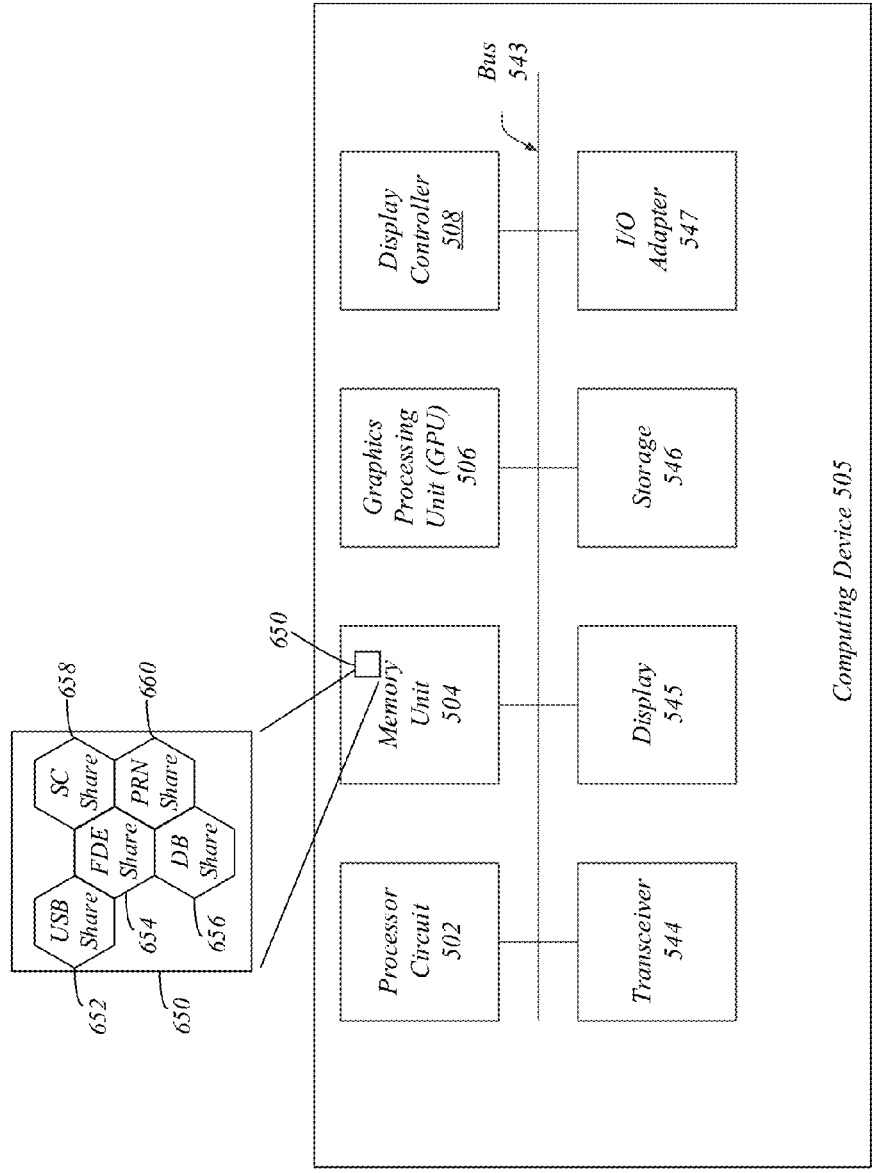
FIG. 6 illustrates an embodiment of a computing system.

FIG. 6 illustrates an embodiment of system 600. System 600 includes computing device 505 as previously discussed above with respect to FIG. 5. As mentioned, the memory 504 may store information and data. In some embodiments, the memory 504 may include a secure location 650 to store one or more share values and other information. In various embodiments, the secure location may be an encrypted portion of memory 504 using Intel's® Memory Protection Extensions (Intel® MPX) or any other trusted computing technique. In some embodiments, secure location 650 may be a separate memory and may be part of a trusted computing environment such as Intel's® Trusted Platform Module (TPM). Various embodiments are not limited in this manner.

In various embodiments, the secure location 650 may including any number of share values each corresponding with a particular secret value. In other words, each of the share values stored in secure location 650 may be used to reconstruct a different secret value. For example, FIG. 6 illustrates secure location 650 having five share values including a universal serial bus (USB) share 652, a full disk encryption (FDE) share 654, a database (DB) share 656, a smartcard (SC) share 658, and a root pseudo random number (PRN) share 660. Each of the share values may be updated periodically and when the computing device 505 is coupled with a distribution device, for example. In some embodiments, the share values may updated a different times. For example, the USB share 652 may be updated on a monthly basis while the SC share 658 may be updated on weekly basis. Various embodiments are not limited in this manner.

In some embodiments, the secure location 650 may be located in a portion of storage 546 (not shown). For example, storage 546 may include an encryption portion, such as a sector that may be used to store the secure location including the share values. Various other embodiments may also be contemplated.

Figure 7A:
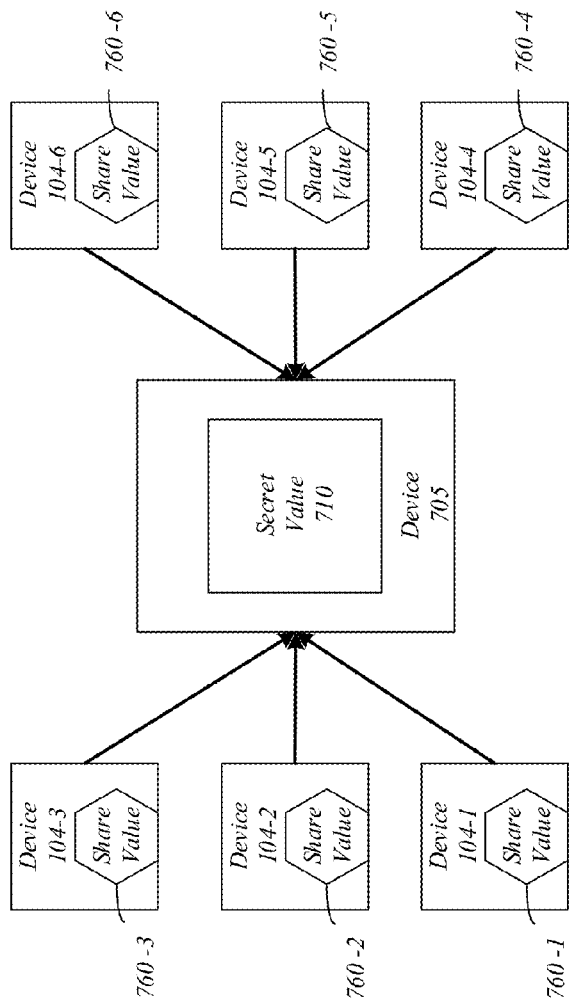
FIGS. 7A/7B/7C illustrate embodiments of computing systems reconstructing a secret value.

FIGS. 7A/7B/7C illustrates an embodiment of a system 700 recreating a secret value. FIG. 7A illustrates system 700 including a device 705 reconstructing secret value 710 from a number of share values 760-1 through 760-6. Device 705 may be any device, such as a distribution device or any other type of device that may receive or retrieve share values from other devices. In some embodiments, device 705 may be a server, personal computer, laptop computer, a cellular device, and so forth. Various embodiments are not limited to these examples, and device 705 may be any device capable of performing mathematical operations to determine a secret value from a number of share values.

In some embodiments, the secret value 710 may be a root value for a pseudo random number generator tree which may be kept securely by distributing a number of share values 760-1 through 760-6 to a number of devices. This may be advantageous if a device storing the original root value is lost, becomes corrupted or is not available to distribute the root value to other devices, such as distribution devices. In some embodiments, the secret value may be solved for by using the polynomial function f(x) and a number of the share values. For example, FIG. 7A illustrates device 705 determining the secret value 710 by using share values 760-1 through 760-6. The number of share values required to determine the secret value may be based on the threshold secret sharing scheme used for generating the share values.

Figure 7B:
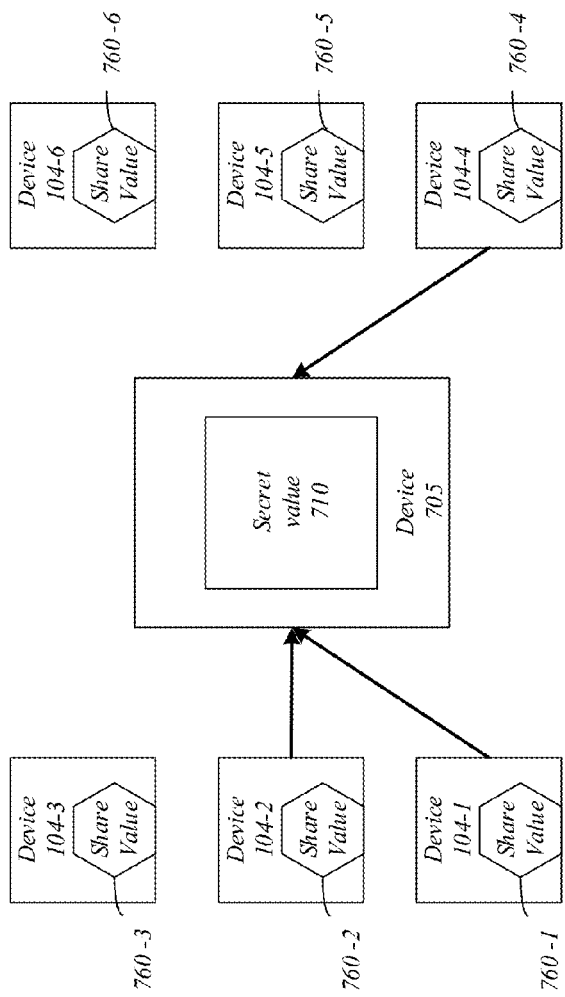
Figure 7C:
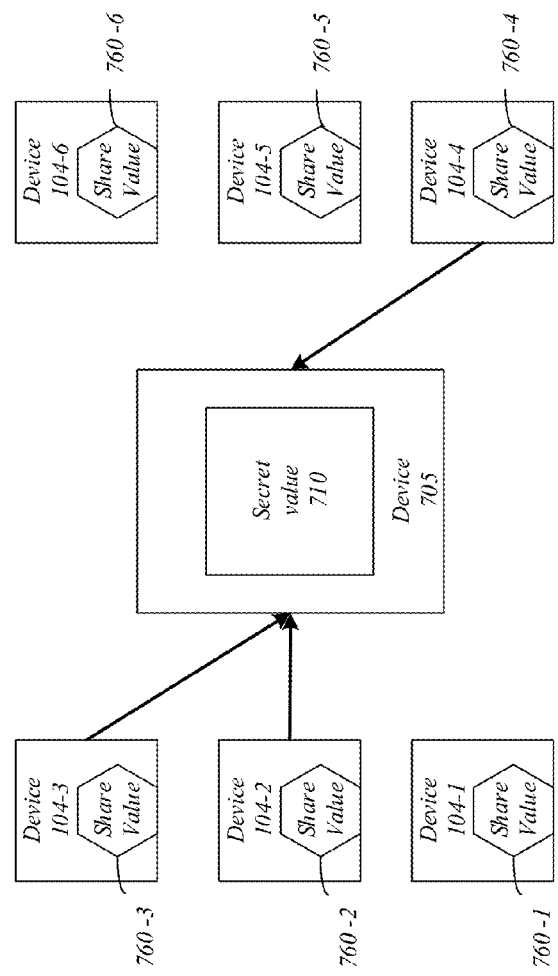

More specifically, the threshold scheme may be defined as a (k, n) threshold scheme, where k equals the number of shares required to reconstruct the secret value and n equals the number of share values for distribution. For example and in one embodiment a (3, 6) secret sharing threshold scheme may be used to create share values 760-1 through 760-6 for the secret value 710, as illustrated in FIGS. 7A/7B/7C. Thus any combination of three share values may be used to reconstruct the secret value 710. FIG. 7B illustrates one embodiments where system 700 recreates secret value 710 from share values 760-1, 760-2 and 760-4. FIG. 7C illustrates another embodiment where system 700 recreates secret value 710 from share values 760-2, 760-3 and 760-4.

Various embodiments are not limited to these examples and device 705 may recreate the secret value 710 from any combination of three share values 760-1 through 760-6, in this example. In some embodiments, a different threshold scheme may be used when generating the share values and a different number of share values may be required to recreate a secret value. For example, more share values may be required to reconstruct a root value than other less important values. More specifically, all the devices receiving a share value may be needed to reconstruct a root value. Various embodiments are not limited in this manner.

FIG. 8 illustrates one embodiment of a third logic flow 800. The logic flow 800 may be representative of some or all of the operations executed by one or more embodiments described herein. For example, the logic flow 800 may illustrate operations performed by system 100 including distribution devices 102-1 and 102-2 and devices 104 of FIG. 1 and distribution device 200 of FIG. 2.

In the illustrated embodiment shown in FIG. 8, the logic flow 800 may include generating one or more polynomial elements for a polynomial function using a node value of a pseudo random number generator tree as a seed value, the polynomial function comprising a secret value and the polynomial elements, and the pseudo random number generator tree at least partially matching one other pseudo random number generator tree on another device at block 805. In other words, two or more devices may include at least a portion of the same pseudo random number generator tree which may be used to generate the same polynomial elements on each device. Thus, multiple devices may generate the same polynomial function having the same polynomial elements to generate share values for distribution.

In some embodiments, the logic flow 800 may include generating a plurality of share values based on the one or more polynomial elements and the polynomial function. For example, one or more input values may be randomly chosen or based on a device identification and used by the polynomial function to generate share values. The share values may be used by a device to reconstruct the secret value, and a previously described above the number of polynomial elements generated and the number of share values generated may be based on a number of devices to receive a share value and the number of share values required to reconstruct the secret value. For example, if six devices are to receive a share value and three are required to reconstruct a secret value, two polynomial elements may be generated based on a (3, 6) secret sharing threshold scheme. Various embodiments are not limited in this manner.

The logic flow 800 may also include distributing a share value of the plurality of share values to a device at block 815. In some embodiments, a device may distribute a sub-set of the total number of share values that are to be distributed. One or more other devices may distribute the remaining share values to devices. For example, a distribution device may distribute three share values, each to a particular device and another distribution device may distribute three additional share values for the secret value, each to a particular device.

The share values may be distributed to the devices in any particular manner including any form of wireless or wired connection. In some embodiments, the share values may be communicated using radio frequency communications including sending and receiving packets of information, for example. In the same or other embodiments, the share values may be distributed to devices using a near field communication technique. In a third example, the share values may be distributed to the devices using a Bluetooth® communication technique. Various embodiments are not limited to these examples.

Figure 9:
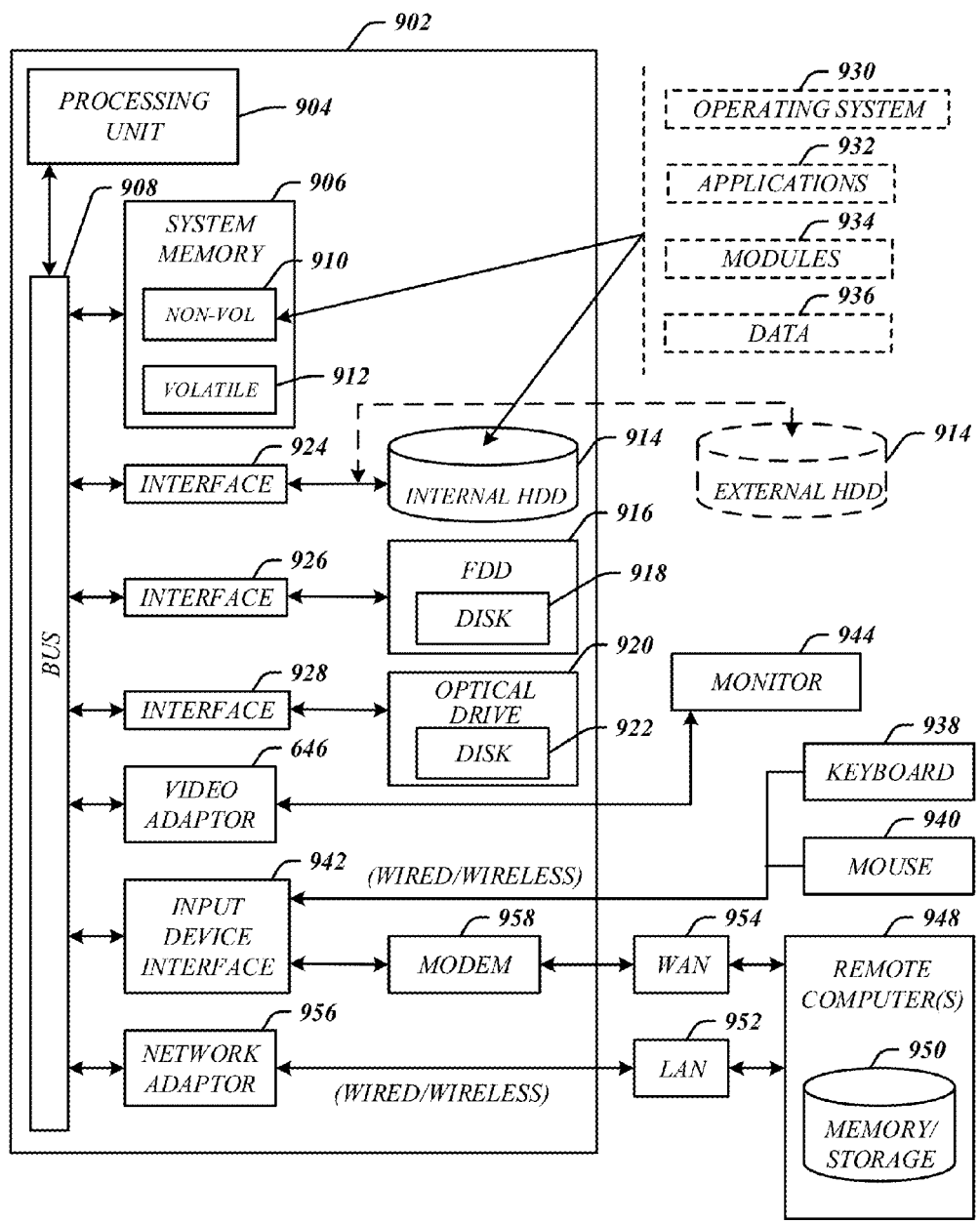
FIG. 9 illustrates an embodiment of a first computing architecture.

FIG. 9 illustrates an embodiment of a computing architecture 900 suitable for implementing various embodiments as previously described. In one embodiment, the computing architecture 900 may comprise or be implemented as part of system 100 and computing device 105.

As used in this application, the terms "system" and "component" are intended to refer to a computer-related entity, either hardware, a combination of hardware and software, software, or software in execution, examples of which are provided by the computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, such as those described with reference to the processor component 102 shown in FIG. 1.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 105.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 100 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-two (1-32) provided below are intended to be exemplary and non-limiting.

In a first example, a system, a device or an apparatus may include a memory coupled with logic to generate at least a portion of a pseudo random number generator tree at least partially matching a second pseudo random number generator tree on one other device, the pseudo random number generator tree comprising a root value and one or more node values based on the root value. Further, the system, device or apparatus may include processing circuitry coupled with the memory, the processing circuitry to generate one or more polynomial elements for a polynomial function using one of the node values as a seed value, the polynomial function comprising a secret value and the polynomial elements, generate a plurality of share values based on the one or more polynomial elements and the polynomial function, and distribute a share value of the plurality of share values to a device.

In a second example and in furtherance of the first example, a system, device, or apparatus may include the processing circuitry to determine the seed value to generate the one or more polynomial elements based on a decomposable contextual value comprising at least a time value.

In a third example and in furtherance of any of the previous examples, a system, device or apparatus may include the time value comprising one or more of a year value, a month value, a day value, and an hour value.

In a fourth example and in furtherance of any of the previous examples, a system, device or apparatus may include the processing circuitry to randomly select an input value for the polynomial function to generate the share value using the polynomial function.

In a fifth example and in furtherance of any of the previous examples, a system, device or apparatus may include the processing circuitry to use a device identification for the device as an input value for the polynomial function to generate the share value.

In a sixth example and in furtherance of any of the previous examples, a system, device or apparatus may include validate the device based on a device identification prior to distributing the share value to the device, and prohibit the distribution of the share value to the device if the device is not valid.

In a seventh example and in furtherance of any of the previous examples, a system, device or apparatus may include generate the plurality share values equaling a number of a plurality devices such that each device is to receive a unique share value, and distribute a unique share value to each of the plurality of devices.

In an eighth example and in furtherance of any of the previous examples, a system, device or apparatus may include the processing circuitry to determine the secret value based on a subset of the plurality of share values.

In a ninth example and in furtherance of any of the previous examples, a system, device or apparatus may include wherein the secret value is a seed value for at least a portion of the pseudo random number generator tree.

In a tenth example and in furtherance of any of the previous examples, a system, device or apparatus may include comprising a distribution device comprising the memory and processing circuitry and further including a charging module to perform charging operations, an input device and a transceiver, wherein at least one of the input device and the transceiver operable to receive an input comprising the secret value.

In a eleventh example and in furtherance of any of the previous examples, a method may include generating one or more polynomial elements for a polynomial function using a node value of a pseudo random number generator tree as a seed value, the polynomial function comprising a secret value and the polynomial elements, and the pseudo random number generator tree at least partially matching at least one other pseudo random number generator tree on another device, generating a plurality of share values based on the one or more polynomial elements and the polynomial function, and distributing a share value of the plurality of share values to a device.

In a twelfth example and in furtherance of any of the previous examples, a method may include determining the seed value to generate the one or more polynomial elements based on a decomposable contextual value comprising at least a time value.

In a thirteenth example and in furtherance of any of the previous examples, a method may include randomly selecting an input value for the polynomial function to generate the share value using the polynomial function.

In a fourteenth example and in furtherance of any of the previous examples, a method may include using a device identification for the device as an input value for the polynomial function to generate the share value.

In a fifteenth example and in furtherance of any of the previous examples, a method may include validating the device based on a device identification prior to distributing the share value to the device, and prohibiting the distribution of the share value to the device if the device is not valid.

In a sixteenth example and in furtherance of any of the previous examples, a method may include generating the plurality share values equaling a number of a plurality devices such that each device is to receive a unique share value, and distributing a unique share value to each of the plurality of devices.

In a seventeenth example and in furtherance of any of the previous examples, a method may include determining the secret value based on a subset of the plurality of share values.

In an eighteenth example and in furtherance of any of the previous examples, a method may include the secret value is a seed value for at least a portion of the pseudo random number generator tree.

In a nineteenth example and in furtherance of any of the previous examples, an article comprising a computer-readable storage medium containing a plurality of instructions that when executed enable processing circuitry to generate one or more polynomial elements for a polynomial function using a node value of a pseudo random number generator tree as a seed value, the polynomial function comprising a secret value and the polynomial elements, and the pseudo random number generator tree at least partially matching one other pseudo random number generator tree on another device, generate a plurality of share values based on the one or more polynomial elements and the polynomial function, and distribute a share value of the plurality of share values to a device.

In a twentieth example and in furtherance of any of the previous examples, an article comprising a computer-readable storage medium containing a plurality of instructions that when executed enable processing circuitry to determine the seed value to generate the one or more polynomial elements based on a decomposable contextual value comprising at least a time value.

In a twenty-first example and in furtherance of any of the previous examples, an article comprising a computer-readable storage medium containing a plurality of instructions that when executed enable processing circuitry to randomly select an input value for the polynomial function to generate the share value using the polynomial function.

In a twenty-second example and in furtherance of any of the previous examples, an article comprising a computer-readable storage medium containing a plurality of instructions that when executed enable processing circuitry to use a device identification for the device as an input value for the polynomial function to generate the share value.

In a twenty-third example and in furtherance of any of the previous examples, an article comprising a computer-readable storage medium containing a plurality of instructions that when executed enable processing circuitry to validate the device based on a device identification prior to distributing the share value to the device, and prohibit the distribution of the share value to the device if the device is not valid.

In a twenty-fourth example and in furtherance of any of the previous examples, an article comprising a computer-readable storage medium containing a plurality of instructions that when executed enable processing circuitry to generate the plurality share values equaling a number of a plurality devices such that each device is to receive a unique share value, and distribute a unique share value to each of the plurality of devices.

In a twenty-fifth example and in furtherance of any of the previous examples, an article comprising a computer-readable storage medium containing a plurality of instructions that when executed enable processing circuitry to determine the secret value based on a subset of the plurality of share values.

In a twenty-sixth example and in furtherance of any of the previous examples, an apparatus, system or device may include means for generating one or more polynomial elements for a polynomial function using a node value of a pseudo random number generator tree as a seed value, the polynomial function comprising a secret value and the polynomial elements, and the pseudo random number generator tree at least partially matching one other pseudo random number generator tree on another device, means for generating a plurality of share values based on the one or more polynomial elements and the polynomial function and means for distributing a share value of the plurality of share values to a device.

In a twenty-seventh example and in furtherance of any of the previous examples, an apparatus, system or device may include means for determining the seed value to generate the one or more polynomial elements based on a decomposable contextual value comprising at least a time value.

In a twenty-eighth example and in furtherance of any of the previous examples, an apparatus, system or device may include means for randomly selecting an input value for the polynomial function to generate the share value using the polynomial function.

In a twenty-ninth example and in furtherance of any of the previous examples, an apparatus, system or device may include means for using a device identification for the device as an input value for the polynomial function to generate the share value.

In a thirtieth example and in furtherance of any of the previous examples, an apparatus, system or device may include means for validating the device based on a device identification prior to distributing the share value to the device and means for prohibiting the distribution of the share value to the device if the device is not valid.

In a thirty-first example and in furtherance of any of the previous examples, an apparatus, system or device may include means for generating the plurality share values equaling a number of a plurality devices such that each device is to receive a unique share value, and means for distributing a unique share value to each of the plurality of devices.

In a thirty-second example and in furtherance of any of the previous examples, an apparatus, system or device may include means for determining the secret value based on a subset of the plurality of share values.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a memory coupled with logic, the logic capable of generating at least a portion of a first pseudo random number generator tree at least partially matching a second pseudo random number generator tree on another device, each of the first and second pseudo random number generator trees comprising a root value and one or more node values based on the root value; and
   processing circuitry coupled with the memory, the processing circuitry to:
   generate one or more polynomial elements using a node value of the one or more node values common to the first and second pseudo random number generator trees as a seed value to create a first polynomial function matching a second polynomial function on the other device, the first polynomial function comprising a secret value and the one or more polynomial elements,
   generate a plurality of share values based on the one or more polynomial elements and the first polynomial function, each respective share value of the plurality of share values generated based on a respective device identification uniquely associated with a respective device or a derivation of the respective device identification,
   determine the secret value based on a subset of the plurality of share values, and
   distribute a share value of the plurality of share values to a device in response to generation of the share value based on a device identification uniquely associated with the device or a derivation of the device identification.

2. The apparatus of claim 1, wherein the processing circuitry is to determine the seed value to generate the one or more polynomial elements based on a decomposable contextual value comprising at least a time value.

3. The apparatus of claim 2, wherein the time value comprises one or more of a year value, a month value, a day value, and an hour value.

4. The apparatus of claim 1, wherein the processing circuitry is to randomly select an input value for the first polynomial function to generate the share value using the first polynomial function.

5. The apparatus of claim 1, wherein the processing circuitry is to use the device identification or the derivation of the device identification as an input value for the first polynomial function to generate the share value.

6. The apparatus of claim 1, wherein the processing circuitry is to:
   validate the device based on the device identification prior to distributing the share value to the device, and
   prohibit the distribution of the share value to the device if the device is not valid.

7. The apparatus of claim 1, wherein the processing circuitry is to:
   generate the plurality share values equaling a number of a plurality devices such that each device is to receive a unique share value, and
   distribute a unique share value to each of the plurality of devices.

8. The apparatus of claim 1, wherein the secret value is a seed value for at least a portion of the first and second pseudo random number generator trees.

9. The apparatus of claim 1, comprising a distribution device comprising the memory and processing circuitry and further comprising:
   a charging module to perform charging operations;
   an input device; and
   a transceiver, wherein at least one of the input device and the transceiver operable to receive an input comprising the secret value.

10. A computer-implemented method, comprising:
    generating one or more polynomial elements using a node value of a first pseudo random number generator tree as a seed value to create a first polynomial function matching a second polynomial function on another device, the first polynomial function comprising a secret value and the one or more polynomial elements, and the first pseudo random number generator tree at least partially matching a second pseudo random number generator tree on the other device, the node value of the first pseudo random number generator tree used as the seed value common to the first and second pseudo random number generator trees;
    generating a plurality of share values based on the one or more polynomial elements and the first polynomial function, each respective share value of the plurality of share values generated based on a respective device identification uniquely associated with a respective device or a derivation of the respective device identification;
    determining the secret value based on a subset of the plurality of share values; and
    distributing a share value of the plurality of share values to a device in response to generation of the share value based on a device identification uniquely associated with the device or a derivation of the device identification.

11. The computer-implemented method of claim 10, comprising determining the seed value to generate the one or more polynomial elements based on a decomposable contextual value comprising at least a time value.

12. The computer-implemented method of claim 10, comprising randomly selecting an input value for the first polynomial function to generate the share value using the first polynomial function.

13. The computer-implemented method of claim 10, comprising using the device identification or the derivation of the device identification as an input value for the first polynomial function to generate the share value.

14. The computer-implemented method of claim 10, comprising:
- validating the device based on the device identification prior to distributing the share value to the device, and
- prohibiting the distribution of the share value to the device if the device is not valid.

15. The computer-implemented method of claim 10, comprising:
- generating the plurality share values equaling a number of a plurality devices such that each device is to receive a unique share value, and
- distributing a unique share value to each of the plurality of devices.

16. The computer-implemented method of claim 10, wherein the secret value is a seed value for at least a portion of the first pseudo random number generator tree.

17. An article comprising at least one non-transitory computer-readable storage medium containing a plurality of instructions that when executed enable processing circuitry to:
- generate one or more polynomial elements using a node value of a first pseudo random number generator tree as a seed value to create a first polynomial function matching a second polynomial function on another device, the first polynomial function comprising a secret value and the one or more polynomial elements, and the first pseudo random number generator tree at least partially matching a second pseudo random number generator tree on the other device, the node value of the first pseudo random number generator tree used as the seed value common to the first and second pseudo random number generator trees;
- generate a plurality of share values based on the one or more polynomial elements and the first polynomial function, each respective share value of the plurality of share values generated based on a respective device identification uniquely associated with a respective device or a derivation of the respective device identification;
- determine the secret value based on a subset of the plurality of share values; and
- distribute a share value of the plurality of share values to a device in response to generation of the share value based on a device identification uniquely associated with the device or a derivation of the device identification.

18. The article of claim 17, comprising instructions that when executed enable the computing device to determine the seed value to generate the one or more polynomial elements based on a decomposable contextual value comprising at least a time value.

19. The article of claim 17, comprising instructions that when executed enable the computing device to randomly select an input value for the polynomial function to generate the share value using the first polynomial function.

20. The article of claim 17, comprising instructions that when executed enable the computing device to use the device identification or the derivation value of the device identification as an input value for the first polynomial function to generate the share value.

21. The article of claim 17, comprising instructions that when executed enable the computing device to:
- validate the device based on the device identification prior to distributing the share value to the device, and
- prohibit the distribution of the share value to the device if the device is not valid.

22. The article of claim 17, comprising instructions that when executed enable the computing device to:
- generate the plurality share values equaling a number of a plurality devices such that each device is to receive a unique share value, and
- distribute a unique share value to each of the plurality of devices.

* * * * *